US006606476B2

(12) United States Patent
Law et al.

(10) Patent No.: US 6,606,476 B2
(45) Date of Patent: Aug. 12, 2003

(54) TRANSFIX COMPONENT HAVING HALOELASTOMER AND SILICONE HYBRID MATERIAL

(75) Inventors: Kock-Yee Law, Penfield, NY (US); Xiaoying (Elizabeth) Yuan, Fairport, NY (US); Edward L. Schlueter, Jr., Rochester, NY (US); Ihor W. Tarnawskyj, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/021,036

(22) Filed: Dec. 19, 2001

(65) Prior Publication Data

US 2003/0118381 A1 Jun. 26, 2003

(51) Int. Cl.[7] .......................... G03G 13/20; B32B 9/04; B25F 5/02

(52) U.S. Cl. ....................... 399/307; 399/333; 430/124; 430/126

(58) Field of Search ................................ 399/307, 333; 430/124, 126

(56) References Cited

U.S. PATENT DOCUMENTS

| | | | | | |
|---|---|---|---|---|---|
| 4,853,737 | A | * | 8/1989 | Hartley et al. | 399/333 |
| 5,736,250 | A | * | 4/1998 | Heeks et al. | 428/447 |
| 5,935,712 | A | * | 8/1999 | Tan et al. | 428/421 |

* cited by examiner

*Primary Examiner*—Mark A. Chapman
(74) *Attorney, Agent, or Firm*—Annette L. Bade

(57) ABSTRACT

A transfix member with a substrate, an optional intermediate layer, and thereover an outer layer having a fluoroelastomer and polyamino polysiloxane, and a heating member associated with the transfix member.

22 Claims, 2 Drawing Sheets

TRANSFIX COMPONENT HAVING HALOELASTOMER AND SILICONE HYBRID MATERIAL

BACKGROUND OF THE INVENTION

The present invention relates generally to an imaging apparatus and layers for components thereof, and for use in electrostatographic, including digital, apparatuses. The layers herein are useful for many purposes including layers for transfix films or transfuse films, and the like. More specifically, the present invention relates to layers comprising a hybrid material of a fluoroelastomer and polyamino polysiloxane material. In embodiments, the layers are useful for layers of transfix or transfuse members. In embodiments, the layer is useful as an outer layer of a transfix member. In embodiments, there may be included an optional intermediate layer between the transfix substrate and outer hybrid layer. The layers of the present invention may be useful in films, belts or the like members, and may be used in xerographic machines, especially color machines.

In a typical electrostatographic reproducing apparatus such as an electrophotographic imaging system using a photoreceptor, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member can be transferred to an image receiving substrate such as paper via an intermediate transfer member. Alternatively, the developed image can be transferred to an intermediate transfer member from the image-receiving member via another transfer member. The toner particles may be transferred by heat and/or pressure to an intermediate transfer member, or more commonly, the toner image particles may be electrostatically transferred to the intermediate transfer member by means of an electrical potential between the imaging member and the intermediate transfer member. After the toner has been transferred to the intermediate transfer member, it can then be transferred to the image receiving substrate, for example by contacting the substrate with the toner image on the intermediate transfer member under heat and/or pressure. Alternatively, the developed image can be transferred to another intermediate transfer member such as a transfix or transfer member. A transfix or transfuse member uses heat associated with the transfer member in order to both transfer and fix or fuse the developed image to a copy substrate.

Intermediate transfer members, including transfix or transfuse members, enable high throughput at modest process speeds. In four-color photocopier systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing machines in which the toner image is transferred from the transfix member to the image receiving or copy substrate, it is important that the transfer of the toner particles from the transfix member to the image receiving substrate be substantially 100 percent. Less than complete transfer to the image receiving substrate results in image degradation and low resolution. Completely efficient transfer is particularly important when the imaging process involves generating full color images since undesirable color deterioration in the final colors can occur when the color images are not completely transferred from the transfer member.

Thus, it is important that the transfix member surface has excellent release characteristics with respect to the toner particles. Conventional materials known in the art for use as transfix members often possess the strength, conformability and electrical conductivity necessary for use as transfix members, but can suffer from poor toner release characteristics, especially with respect to higher gloss image receiving substrates. When heat is associated with a transfer member, such as in the case of a transfix member, the transfix member must also possess good thermal conductivity in addition to superior release characteristics. Also, there is a need for mechanical strength for wear resistance. A transfix member undergoes multiple cycling during use.

In addition, in the event that electrically conductive fillers are needed to build electrical and thermal conductivities, and/or mechanical strength, it is necessary that the fillers be compatible with the materials used in the transfix member. Similarly, if release fluids are used, the materials in the transfix member and the fillers, if used, must be compatible with the release fluid materials. Also, the fillers, if used, and the materials in the transfix members must be chemically compatible with toners or liquid developers used in the electrostatographic apparatus.

Conventionally, for transfuse or transfix applications, a conformable member is used. Silicone is a very popular outer layer for transfix and transfuse members, especially for transfuse or transfix belts or films. Silicone possesses excellent toner release characteristics. However, the major drawback to using silicone as the outer layer is the short performance life. This is especially true in liquid marking applications, wherein the carrier fluid swells the silicone layer and results in excessive belt wear. The mechanical property of the belt deteriorates significantly, resulting in short belt life. For dry powder marking, it is believed that the mechanism of toner release requires extrusion of the silicone oligomer. The extruded oligomer serves as the release agent. However, as the oligomer is extruded, the property of the belt changes and the performance life of the belt is reduced. The belt becomes less compliant and its release function deteriorates. The extrusion degrades the belt simultaneously.

One countermeasure to the above problems is to use a fluoroelastomer surface for the transfuse member. In fact, many forms of fluoroelastomers are much stronger than silicone. However, the fluoroelastomers can usually not release toner on their own. A,release agent management (RAM) system has to be introduced in order to overcome this shortfall. The potential problem with introduction of a RAM system is that oil contamination of the entire transfuse subsystem can occur.

Further, it is desirable to provide a print engine that is targeted for all of office, production, color and offset market. Such a print engine would need to be able to print on many different types of substrates, and have the capability to mark papers of different weight and different roughness, such as wallpapers, textiles, foils, and other papers. In electrostatography, extended substrate, latitude may be accomplished through the transfuse process where the toner images are transferred and fused simultaneously. Since fusing is accomplished on the transfuse member, the member should be stiff, compliant and have sufficient toner release characteristics for the outer surface as well.

Therefore, the requirements for transfuse surfaces are demanding and sometimes conflicting.

U.S. Pat. No. 4,853,737 discloses electrostatographic rollers having an outer layer comprising a cured fluoroelastomer containing pendant polydiorganosiloxane segments that are covalently bonded to the backbone of the fluoroelastomer.

U.S. Pat. No. 5,361,126 discloses an imaging apparatus including a transfer member including a heater and pressure-applying roller, wherein the transfer member includes a fabric substrate and an impurity-absorbent material as a top layer. The impurity-absorbing material can include a rubber elastomer material.

U.S. Pat. No. 5,337,129 discloses an intermediate transfer component comprising a substrate and a ceramer or grafted ceramer coating comprised of, integral, interpenetrating networks of haloelastomer, silicon oxide, and optionally polyorganosiloxane.

U.S. Pat. No. 5,340,679 discloses an intermediate transfer component comprised of a substrate and thereover a coating comprised of a volume grafted elastomer, which is a substantially uniform integral interpenetrating network of a hybrid composition of a fluoroelastomer and a polyorganosiloxane.

U.S. Pat. No. 5,480,938 describes a low surface energy material comprising a volume grafted elastomer which is a substantially uniform integral interpenetrating network of a hybrid composition of a fluoroelastomer and a polyorganosiloxane, the volume graft having been formed by dehydrofluorination of fluoroelastomer by a nucleophilic dehydrofluorinating agent, followed by a hydrosilation reaction, addition of a hydrogen functionally terminated polyorganosiloxane and a hydrosilation reaction catalyst.

U.S. Pat. No. 5,366,772 describes a fuser member comprising a supporting substrate, and a outer layer comprised of an integral interpenetrating hybrid polymeric network comprised of a haloelastomer, a coupling agent, a functional polyorganosiloxane and a crosslinking agent.

U.S. Pat. No. 5,456,987 discloses an intermediate transfer component comprising a substrate and a titamer or grafted titamer coating comprised of integral, interpenetrating networks of haloelastomer, titanium dioxide, and optionally polyorganosiloxane.

U.S. Pat. No. 5,848,327 discloses an electrode member positioned near the donor member used in hybrid scavengeless development, Wherein the electrode members have a composite haloelastomer coating.

U.S. Pat. No. 5,576,818 discloses an intermediate toner transfer component including: (a) an electrically conductive substrate; (b) a conformable and electrically resistive layer comprised of a first polymeric material; and (c) a toner release layer comprised of a second polymeric material selected from the group consisting of a fluorosilicone and a substantially uniform integral interpenetrating network of a hybrid composition of a fluoroelastomer and a polyorganosiloxane, wherein the resistive layer is disposed between the substrate and the release layer.

U.S. Pat. No. 6,037,092 discloses a fuser member comprising a substrate and at least one layer thereover, the layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

U.S. Pat. No. 5,537,194 discloses an intermediate toner transfer member comprising: (a) a substrate; and (b) an outer layer comprised of a haloelastomer having pendant hydrocarbon chains covalently bonded to the backbone of the haloelastomer.

U.S. Pat. No. 5,753,307 discloses fluoroelastomer surfaces and a method for providing a fluoroelastomer surface on a supporting substrate which includes dissolving a fluoroelastomer; adding a dehydrofluorinating agent; adding an amino silane to form a resulting homogeneous fluoroelastomer solution; and subsequently providing at least one layer of the homogeneous fluoroelastomer solution to the supporting substrate.

U.S. Pat. No. 5,840,796 describes polymer nanocomposites including a mica-type layered silicate and a fluoroelastomer, wherein the nanocomposite has a structure selected from the group consisting of an exfoliated structure and an intercalated structure.

U.S. Pat. No. 5,846,643 describes a fuser member for use in an electrostatographic printing machine, wherein the fuser member has at least one layer of an elastomer composition comprising a silicone elastomer and a mica-type layered silicate, the silicone elastomer and mica-type layered silicate form a delaminated nanocomposite with silicone elastomer inserted among the delaminated layers of the mica-type layered silicate.

Therefore, it is desired to provide a transfix member that possesses the qualities of conformability for copy quality and latitude, and also is tough for wear resistance. A further desired characteristic is for a transfer member to have a reduced susceptibility to swelling in the presence of release oils or in the presence of liquid marking materials. An additional desired property for a transfix or transfuse member having heat associated therewith, is for the transfix member to be thermally stable for conduction for fusing or fixing. In addition, it is desired to provide a transfuse member that can be used to transfer and fuse toner material to a variety of copy substrates. It is further desirable to provide a transfix member having high tensile strength, while providing good release characteristics. It is also desirable to provide a transfix member having long life.

SUMMARY OF THE INVENTION

The present invention provides, in embodiments: an apparatus for forming images on a recording medium comprising: a) a charge-retentive surface to receive an electrostatic latent image thereon; b) a development component to apply a developer material to the charge-retentive surface to develop the electrostatic latent image to form a developed image on the charge-retentive surface; c) a transfer component for transferring the developed image from the charge-retentive surface to an intermediate transfer component; d) an intermediate transfer component for receiving the developed image from the transfer component and transferring the developed image to a transfix component; and e) a transfix component to transfer the developed image from the intermediate transfer component to a copy substrate and to fix the developed image to the copy substrate, the transfix component comprising: i) a transfix substrate, and ii) an outer layer comprising a hybrid composition comprising polyamino polysiloxane and fluoroelastomer, and iii) a heating member associated with the transfix component.

The present invention further provides, in embodiments: a transfix member comprising: a) a transfix substrate, and thereover b)an outer coating comprising a hybrid composition comprising polyamino polysiloxane and fluoroelastomer, and c) a heating member associated with the transfix member.

In addition, the present invention provides, in embodiments: an apparatus for forming images on a recording medium comprising: a) a charge-retentive surface to receive an electrostatic latent image thereon; b) a development component to apply a developer material to the charge-retentive surface to develop the electrostatic latent image to form a developed image on the charge-retentive surface; c) a transfer component for transferring the developed image from the charge-retentive surface to an intermediate transfer component; d) an intermediate transfer component for receiving the developed image from the transfer component and transferring the developed image to a transfix component; and e) a transfix component to transfer the developed image from the intermediate transfer component to a copy substrate and to fix the developed image to the copy substrate, the transfix component comprising: i) a transfix substrate comprising a material selected from the group consisting of fabric and metal, and thereover ii) an outer coating comprising a hybrid composition comprising polyamino polysiloxane and fluoroelastomer, and iii) a heating member associated with the transfix component.

BRIEF DESCRIPTION OF THE DRAWINGS

The above embodiments of the present invention will become apparent as the following description proceeds upon reference to the drawings, which include the following figures.

DETAILED DESCRIPTION OF THE INVENTION

The present invention is directed to transfix members having layers. The transfix members can be film components including films, sheets, belts and the like, useful in electrostatographic, including digital, apparatuses. In an embodiment of the present invention, a transfix member includes a substrate and an outer layer comprising a hybrid material of a fluoroelastomer and polyamino polysiloxane. In an alternative embodiment, the transfix member comprises a substrate, intermediate layer, and outer layer comprising a hybrid of a fluoroelastomer and polyamino polysiloxane.

Figure 1:
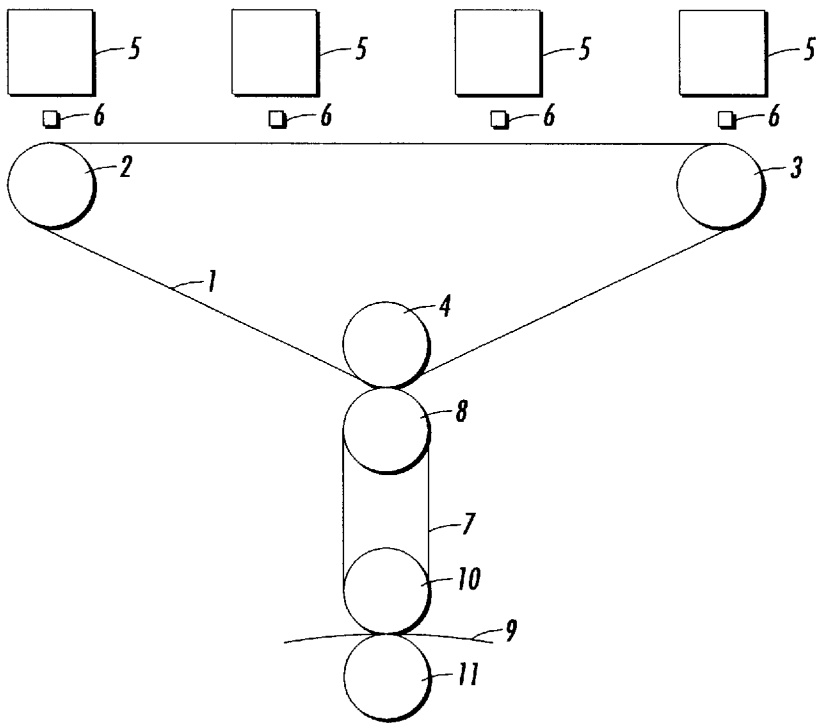
FIG. 1 is an illustration of a general electrostatographic apparatus using a transfix member.

Referring to FIG. 1, there is depicted an image-forming apparatus comprising intermediate transfer member 1 advanced by rollers 2, 3 and 4. Intermediate transfer member 1 is depicted as a belt or film member, but may be of another useful form such as a belt, sheet, film, drum, roller or the like. An image is processed and developed by image processing units 5. There may be as few as 1 processing unit, for example, for 1 color processing such as black, and as many processing units as desired. In embodiments, each processing unit processes a specific color. In embodiments, there are 4 processing units for processing cyan, black, yellow and magenta. The first processing unit, processes one color and transfers this developed one-color image to the intermediate transfer member 1 via transfer member 6. The intermediate transfer member 1 is advanced to the next relevant processing unit 5 and the process is repeated until a fully developed image is present on the intermediate transfer member 1.

After the necessary number of images are developed by image processing members 5 and transferred to intermediate transfer member 1 via transfer members 6, the fully developed image is transferred to transfix member 7. The transfer of the developed image to transfix member 7 is assisted by rollers 4 and 8, either or both of which may be a pressure roller or a roller having heat associated therewith. In an embodiment, one of 4 roller or 8 roller is a pressure member, wherein the other roller 4 or 8 is a heated roller. Heat may be applied internal or external to the roller. Heat may be supplied by any known heat source.

In an embodiment, the fully developed image is subsequently transferred to a copy substrate 9 from transfix member 7. Copy substrate 9, such as paper, is passed between rollers 10 and 11, wherein the developed image is transferred and fused to the copy substrate by transfix member 7 via rollers 10 and 11. Rollers 10 and/or 11 may or may not contain heat associated therewith. In an embodiment, one of rollers 10 and 11 contains heat associated therewith in order to transfer and fuser the developed image to the copy substrate. Any form of known heat source may be associated with roller 10 and/or 11.

Figure 2:
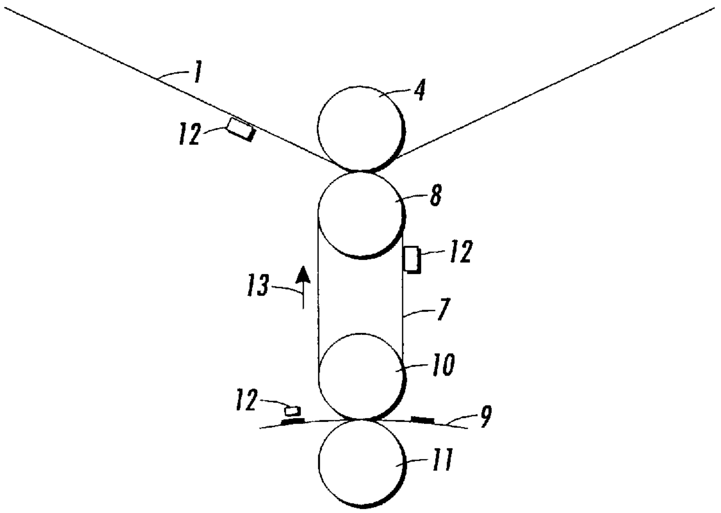
FIG. 2 is an enlarged view of an embodiment of a transfix system.

FIG. 2 demonstrates an enlarged view of an embodiment of a transfix member 7 which may be in the form of a belt, sheet, film, roller, or like form. The developed image 12 positioned on intermediate transfer member 1, is brought into contact with and transferred to transfix member 7 via rollers 4 and 8. As set forth above, roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Figure 3:
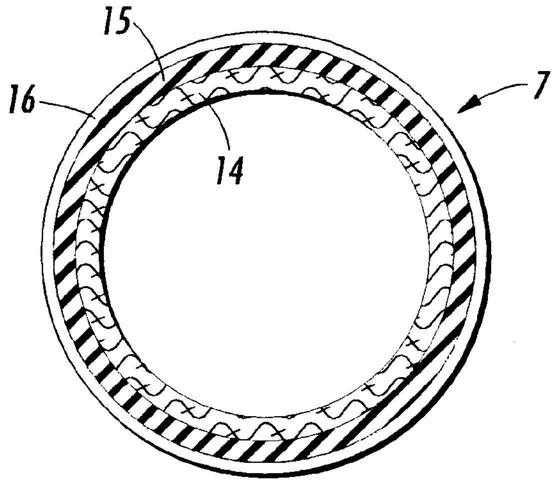
FIG. 3 is an enlarged view of an embodiment of a transfix belt configuration involving a substrate, an intermediate layer, and outer layer.

FIG. 3 demonstrates an embodiment of the invention, wherein transfix member 7 comprises substrate 14, having thereover intermediate layer 15. Outer layer 16 is positioned on the intermediate layer 15. Substrate 14, in embodiments, comprises a fibrous material. In an embodiment, the substrate comprises a fibrous material such as a polyimide, the intermediate layer 15 comprises a rubber layer such as a silicone rubber layer, and the outer layer 16 comprises a hybrid material comprising a fluoroelastomer and polyamino polysiloxane.

Figure 4:
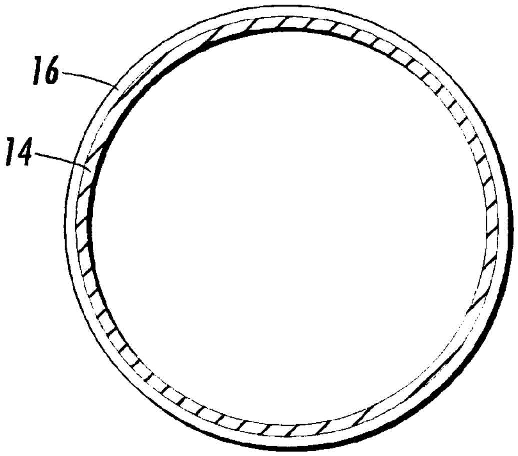
FIG. 4 is an enlarged view of an embodiment of a transfix belt configuration having a substrate and outer layer.

FIG. 4 depicts another embodiment of the invention. FIG. 4 depicts a two-layer configuration comprising a substrate 14 and outer layer 16 positioned on the substrate 14. In an embodiment, the substrate 14 comprises a fibrous material such as a polyimide, and positioned thereon, is a hybrid material of a fluoroelastomer and polyamino polysiloxane as the outer layer 16.

The transfix outer layer(s) herein comprise a fluoroelastomer. Examples of fluoroelastomers include those fluoroelastomers comprising copolymers and terpolymers of vinylidenefluoride, hexafluoropropylene and tetrafluoroethylene (for example, any copolymer comprising a combination of two of these, monomers), which are known commercially under various designations as VITON A®, VITON E®, VITON E60C®, VITON E45®, VITON E430®, VITON B 910®, VITON GH®, VITON B50®, VITON E45®, and VITON GF®. The VITON® designation is a Trademark of E.I. DuPont de Nemours, Inc. Two known fluoroelastomers are (1) a class of copolymers of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene and a cure site monomer, for example, VITON® GF. VITON A®, and VITON B®, and other VITON® designations are trademarks of E.I. DuPont de Nemours and Company. The cure site monomer can be those available from DuPont such as 4-bromoperfluorobutene-1, 1,1-dihydro4-bromoperfluorobutene-1, 3-bromoperfluoropropene-1, 1,1-dihydro-3-bromoperfluoropropene-1, or any other suitable, known, commercially available cure site monomer.

In another embodiment, the fluoroelastomer is a tetrapolymer having a relatively low quantity of vinylidenefluoride. An example is VITON GF®, available from E.I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer.

The fluoroelastomer is present in the transfix layer in an amount of from about 95 to about 50 percent, or from about 90 to about 70 percent, or from about 85 to about 75 percent by weight of total solids. Total solids as used herein refers to the total amount by weight of fluoroelastomer, polyamino polysiloxane, conductive fillers, and any additional additives, fillers or like solid materials.

A polyamino polysiloxane is crosslinked to the fluoroelastomer using known methods such dissolving the fluoroelastomer in a solvent, followed by dehydrofluorination of the polymer by the addition of basic metal oxide or basic metal hydroxide materials. Useful basic metal compounds for dehydrofluorination include magnesium hydroxide, calcium hydroxide, magnesium oxide, lead oxide, and the like, and mixtures thereof. The basic metal materials are believed to react with acidic by-products including hydrogen fluoride and/or derivatives thereof, that are generated during the curing of the fluoroelastomer. The polyamino polysiloxane is added, and the reactive groups react with the dehydrofluorinated fluoroelastomer, resulting in crosslinking the polyamino polysiloxane to the backbone of the fluoroelastomer. The pendant polyamino polysiloxane segments are covalently bonded to the backbone of the fluoroelastomer while it is being cured. The pendant segments of the polysiloxane can form branches on the fluorocarbon backbone of the fluoroelastomer base polymer and/or enter into the crosslink network of the cured fluoroelastomer.

Suitable polyamino polysiloxanes include those such as polyamino polyorganosiloxanes, wherein the organo groups include oligomers free of aliphatic unsaturation such as alkyls such as, for example, methyl, ethyl, propyl, octyl, and the like; cycloalkyls, such as, for example, cyclopropyl, cyclpbutyl, cyclopentyl, cyclohexyl, cycloheptyl, and the like; aryls, such as, for example, phenyls, and the like; aralkyls such as, for example, benzyls, and the like; halogenated derivatives of the aforementioned radicals, such as, for example, chloromethyl, trifluoromethyl, dibromophenyl, tetrachlorophenyl, and the like; and like organo groups.

Examples of suitable polyamino polysiloxanes include those including polydiorganosiloxanes such as alpha, omega difunctional polydiorganosiloxanes such as bis (aminopropyl)terminated poly(dimethylsiloxanes), aminopropylmethylsiloxane dimethylsiloxane copolymers, branched tris(aminopropyl) poly(dimethylsiloxanes), tetrabis (aminopropyl polydimethylsiloxane, and the like. Such oligomers are available in a series of molecular weights as disclosed, for example, by Yilgor et al, "Segmented Organosiloxane Copolymers", Polymer, 1984, V. 25, pp. 1800–1806 and in a treatise entitled "Block Copolymers" by Noshay and McGrath, Academic Press (1977), pages: 392–428. They are prepared, as described by McGrath et al by the ring opening equilibration of octamethylcyclotetrasiloxane in the presence of 1,3-bis (3-aminopropyl) tetramethyldisiloxane and an initiator. An example of a class of polydiorganosiloxane oligomers, based upon availability, includes those having functional groups including amines, phenols, thiols, and the like, that provide the covalent bonding with the backbone of the cured fluoroelastomer. Examples of such oligomers that can be used can be represented by the following general formula:

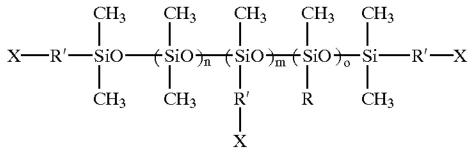

where R is an alkyl or haloalkyl such as methyl, ethyl, propyl, butyl, fluoropropyl, chloropropyl, or the like, or aryl such as phenyl or the like; R' is an alkylene such as methylene, ethylene, propylene, isopropylene or the like, or arylene such as phenylene or the like; X is an amino functional group having an active hydrogen such as, for example, $—NH_2$, —NR"H, $—NHCO_2$, where R" is hydrogen or an alkyl such as methyl, ethyl, propyl, butyl, or the like; n, m and o are positive integers such that n+m+o provides a number average molecular weight in the range of from about 600 to about 20,000, or from about 2,000 to about 14,000. The number average molecular weight of the uncured fluoroelastomer used in this invention is generally in the range of from about 75,000 to about 125,000, or about 100,000.

Examples of suitable polyamino polysiloxanes include diaminopropyl polysiloxane, aminopropyl-dimethylsiloxane copolymers. Specific examples of polyamino polysiloxanes include bis(aminopropyl) terminated polydimethylsiloxane, such as 1,3-bis(3-aminopropyl) tetramethyldisiloxane, aminopropylmethylsiloxane dimethyl siloxane, aminoethylamino propylmethoxysiloxane dimethylsiloxane copolymers, and the like.

The polyamino polysiloxane may be present in the outer layer in an amount of from about 5 to about 30 percent, or from about 10 to about 20 percent by weight of total solids.

The substrate, optional intermediate layer, and outer hybrid layer(s), in embodiments, may comprise electrically conductive particles dispersed therein. These electrical conductive particles decrease the material resistivity into the desired resistivity range. The surface resistivity is from about $10^6$ to about $10^{14}$, or from about $10^9$ to about $10^{13}$, or from about $10^{10}$ to about $10^{12}$ ohms/sq. The volume resistivity range is from about $10^5$ to about $10^{14}$, or from about $10^8$ to about $10^{14}$, or from about $10^{10}$ to about $10^{12}$ ohm-cm. The desired resistivity can be provided by varying the concentration of the conductive filler. It is important to have the resistivity within this desired range. The transfix components may exhibit undesirable effects if the resistivity is not within the required range. Other problems include resistivity that is susceptible to changes in temperature, relative humidity, and the like.

Examples of conductive fillers include conventional electrically conductive fillers such as metals, metal oxides, carbon fillers, conductive polymers, and the like, and mixtures thereof. Examples of suitable metal oxide or hydroxide fillers include titanium dioxide, tin (II) oxide, aluminum oxide, indium-tin oxide, magnesium oxide, copper oxide, iron oxide, zinc oxide, calcium hydroxide, and the like, and mixtures thereof. Examples of carbon fillers include carbon black, graphite, fluorinated carbon (such as ACCUFLUOR® or CARBOFLUOR®), and the like. Examples of polymer fillers include polytetrafluoroethylene powder, polypyrrole, polyacrylonitrile (for example, pyrolyzed polyacrylonitrile), polyaniline, polythiophenes, and mixtures thereof. The optional conductive filler is present in the layer in an amount of from about 1 to about 30 percent, or from about 2 to about 25 percent by weight of total solids in the layer.

In embodiments, the thickness of the outer layer of the transfix member is from about 0.1 to about 10 mils, or from about 1 to about 5 mils.

The substrate can comprise any material having suitable strength and flexibility for use as a transfix member, enabling the member to cycle around rollers during use of the machine. Examples of materials for the substrate include metals, rubbers, plastics and fabrics. Examples of metals include steel, aluminum, nickel, and their alloys, and like metals, and alloys of like metals. Examples of suitable rubbers include ethylene propylene dienes, silicone rubbers, fluoroelastomers, n-butyl rubbers, and the like.

Examples of plastics include those plastics that are suitable for allowing a high operating temperature (i.e., greater than about 80° C., or greater than 200° C., and more specifically, from about 150 to about 250° C.), optionally possessing tailored electrical properties, and capable of exhibiting high mechanical strength. Plastics possessing the above characteristics and which are suitable for use as the transfix substrate include epoxy and epoxy resins; polyphenylene sulfide such as that sold under the tradenames FORTRON® available from Hoechst Celanese, RYTON R-4® available from Phillips Petroleum, and SUPEC® available from General Electric; polyimides such as KAPTON® and UPLIEX® both from DuPont, and ULTEM® from GE, polyamideimide sold under the tradename TORLON® 7130 available from Amoco, polyaniline polyimide, and the like; polyketones such as those sold under the tradename KADEL® E1230 available from Amoco, polyether ether ketone sold under the tradename PEEK 450GL30 from Victrex, polyaryletherketone, and the like; polyamides such as polyphthalamide sold under the tradename AMODEL® available from Amoco, and the like; polyethers such as polyethersulfone, polyetherimide, polyaryletherketone, and the like; polyparabanic acid; and the like, and mixtures thereof.

A fabric material, as used herein; refers to a textile structure comprised of mechanically interlocked fibers or filaments, which may be woven or nonwoven. Fabrics are materials made from fibers or threads and woven knitted or pressed into a cloth or felt type structures. Woven, as used herein, refers to closely oriented by warp and filler strands at right angles to each other. Nonwoven, as used herein, refers to randomly integrated fibers or filaments. The fabric material should have high mechanical strength and possess electrical properties that can be tailored to a desirable range.

Examples of suitable fabrics include woven or nonwoven cotton fabric, graphite fabric, fiberglass, woven or nonwoven polyimide (for example KELVAR® available from DuPont), woven or nonwoven polyamide, such as nylon or polyphenylene isophthalamide (for example, NOMEX® of E.I. DuPont of Wilmington, Del.), polyester, aramids, polycarbonate, polyacryl, polystyrene, polyethylene, polypropylene, cellulose, polysulfone, polyxylene, polyacetal, and the like, and mixtures thereof.

In embodiments, the substrate is of a thickness of from about 0.01 to about 5 mm, or from about 0.1 to about 0.5 mm, or about 0.25 mm.

In an optional embodiment, an intermediate layer may be positioned between the substrate and the outer layer. Materials suitable for use in the intermediate layer include silicone materials, fluoroelastomers, fluorosilicones, ethylene propylene diene rubbers, and the like.

In embodiments, intermediate layer be conformable and be of a thickness of from about 0.1 to about 10 mm, or from about 1 to about 5 mm, or about 1.25 mm.

An adhesive layer may be positioned between the outer hybrid layer and the substrate, or between the intermediate and/or one or both of the outer layer and the substrate layer.

Examples of suitable transfix members include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, and the like. In embodiments, the substrate having the outer layer thereon, be an endless seamed flexible belt or seamed flexible belt, which may or may not include puzzle cut seams.

The transfix film, in the form of a belt, has a width, for example, of from about 150 to about 2,000 mm, or from about 250 to about 1,400 mm, or from about 300 to about 500 mm. The circumference of the belt is from about 75 to about 2,500 mm, or from about 125 to about 2,1 00 mm, or from about 155 to about 550 mm.

The transfix layer having the outer hybrid layer, in embodiments, possesses the qualities of conformability for copy quality and latitude, and also is tough for wear resistance. Also, the transfer member, in embodiments, has a reduced susceptibility to swelling in the presence of release oils or in the presence of liquid marking materials. In addition, the transfix or transfuse member having heat associated therewith, in embodiments, is thermally stable for conduction for fusing or fixing. In addition, the transfuse member, in embodiments, can be used to transfer and fuse toner material to a variety of copy substrates. The transfix member, in embodiments, has high tensile strength, while providing good release characteristics. Further, the transfix member, in embodiments, has a long life.

Specific embodiments of the invention will now be described in detail. These examples are intended to be illustrative, and the invention is not limited to the materials, conditions, or process parameters set forth in these embodiments. All parts are percentages by weight of total solids as defined above unless otherwise indicated.

EXAMPLES

Example 1

Preparation of Fluoroelastomer and Polyamino Siloxane Hybrid Layer

A fluoroelastomer solution was prepared by dissolving about 100 grams of VITON® GF (tetrapolymer of vinylidene fluoride, hexafluoropropylene, tetrafluoroethylene, and a cure site monomer) in about 300 grams of methyl ethyl ketone (MEK) or methyl isobutyl ketone (MIBK) on a roll mill overnight. A dispersion of fillers was prepared by mixing about 2 grams MgO (Maglite D) and about 1 gram $Ca(OH)_2$ in 30 grams of MEK inside an attritor along with about 150 grams of steel shot for about 30 minutes. The fluoroelastomer solution and the filler dispersion were combined and mixed thoroughly on a roll mill for about 60 minutes.

A bisaminopropyl terminated polydimethylsiloxane (15 grams, MW of approximately 2500, DMS—A15 from Gelest, Inc.) was added to the above prepared dispersion. A VITON®-based coated layer was then prepared by coating the above dispersion on a KAPTON® substrate using the draw bar technique. After air drying for about 5 minutes, the layer was first heated in a forced air oven at about 60° C. for about 30 minutes and then post cured at 235° C. overnight (about 20 hours). This resulted in an approximate 2 mil thick layer consisting of the silicone-VITON® hybrid material of the present invention. The weight ratio between the VITON® and the silicone materials is estimated to be from about 100 to about 15.

Using very similar procedures, silicone-VITON® hybrid materials with different VITON®/silicone ratios and different silicone domain sizes (from DMS-A11, DMS-A21, DMS-A32, AMS-132, AMS-162, and the like) have been prepared. In addition, acetate solvents such as ethyl acetate, butyl acetate, and the like can be used as dispersion solvent for the hybrid material.

The adhesion and the toner release property of the above-prepared layers were examined. The results are shown in Tables 1 and 2 below. As shown in Tables2, the hybrid layers demonstrated very low adhesion force in the “tape” peel force test. As shown in Table 2, the layers demonstrate release of liquid toner and dry toner near quantitatively in a “heat-transfer” experiment on a bench fixture. Fluoroelastomer/polyamino siloxane hybrid materials have an advantage over silicone in that the hybrid materials have low solvent absorption and high chemical resistance.

TABLE 1

| Sample ID | Curative | Tape release test | liquid ink transfer test |
|---|---|---|---|
| 1 | 5% VC-50 | 12.7 oz/inch-width | 0% |
| 2 | 5% A11 | 5 oz/inch-width | 90% |
| 3 | 10% A11 | 4 oz/inch-width | 93% |
| 4 | 15% A11 | 3.7 oz/inch-width | 95% |
| 5 | 10% A15 | 2 oz/inch-width | 97+% |
| 6 | 15% A15 | 1.8 oz/inch-width | 97+% |

TABLE 2

| Sample ID | Curative | Isopar L absorption (Vs) | Isopar L absorption at 120 C. |
|---|---|---|---|
| 1 | 3% Diak III | 0 | 0 |
| 2 | 5% VC-50 | 0 | 0 |
| 3 | 5% A11 | 0 | <0.05 VS |
| 4 | 10% A11 | 0 | <0.1 VS |
| 5 | 15% A11 | 0 | <0.1 VS |
| 6 | 5% A21 | 0 | |
| 7 | 10% A21 | 0 | 0.22 VS |
| 8 | 5% S-132 | 0 | |
| 9 | 10% S-132 | 0 | 0.4 VS |
| 10 | 5% S-162 | 0 | |
| 11 | 10% S-162 | 0 | 0.13 VS |
| 12 | 5% A32 | 0 | |

TABLE 2-continued

| Sample ID | Curative | Isopar L absorption (Vs) | Isopar L absorption at 120 C. |
|---|---|---|---|
| 13 | Silicone | Weight change 50% after 1 day in isopar L | >50% weight change |

Comparative Example 2

Preparation of Fluoroelastomer Outer Layer

A coating of a fluoroelastomer was prepared as follows. A coating solution was prepared by using the procedure described in Example 1.

The fluoroelastomer outer coating was then flow coated onto a transfuse polyimide substrate to a thickness of about 2 to 3 mils.

The belt was tested in a transfuse fixture using dry toner and liquid toner. The transfix nip of the fixture was run at about 150 to about 180° C. The fluoroelastomer outer transfuse coating demonstrated a barber pole pattern which was visible in the final transfused image.

This Example demonstrates that insufficient results were obtained when a fluoroelastomer coating without polyamino siloxane groups was used as an outer transfix layer.

Example 3

Testing of Transfuse Belts having Fluoroelastomer and Silicone Hybrid Layer Versus Transfuse Belt having Silicone Layer Three polyimide belts obtained from DuPont were coated with 2 mils of the polysiloxane/fluoroelastomer hybrid material prepared in accordance with Example 1, except that Sample 1 contained 1.0 $mg/cm^2$ of the hybrid, Sample 2 contained 0.8 $mg/cm^2$ of the hybrid, and Sample 3 contained 0.5 $Mg/cm^2$ of the hybrid. The hybrid material was flow coated onto the transfuse belts. Samples 4 and 5 were prepared by coating a 4 mil coating of a silicone 727 material having no polyamino groups.

The belts were tested in a transfuse fixture without release oil for 20 hours. Samples 4 and 5 showed a barber pole pattern which was visible in the final transfused product.

For Samples 1—3, no mechanical failure was observed and the transfuse release was perfect during the entire test.

This Example demonstrates that insufficient results were obtained when a silicone coating without the fluoroelastomer bound to it, and without the polyamino groups, was used as an outer transfix layer.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An apparatus for forming images on a recording medium comprising:

a) a charge-retentive surface to receive an electrostatic latent image thereon;

b) a development component to apply a developer material to the charge-retentive surface to develop the electrostatic latent image to form a developed image on the charge-retentive surface;

c) a transfer component for transferring the developed image from the charge-retentive surface to an intermediate transfer component;

d) an intermediate transfer component for receiving the developed image from the transfer component and transferring the developed image to a transfix component; and e) a transfix component to transfer the developed image from the intermediate transfer component to a copy substrate and to fix the developed image to the copy substrate, the transfix component comprising:

i) a transfix substrate, and ii) an outer layer comprising a hybrid composition comprising polyamino polysiloxane and fluoroelastomer, and iii) a heating member associated with the transfix component.

2. The apparatus of claim 1, wherein said fluoroelastomer is selected from the group consisting of a) copolymers of vinylidenefluoride, hexafluoropropylene, and tetrafluoroethylene, b) terpolymers of vinylidenefluoride, hexafluoropropylene and tetrafluoroethylene, and c) tetrapolymers of vinylidenefluoride, hexafluoropropylene, tetrafluoroethylene, and a cure site monomer.

3. The apparatus of claim 2, wherein said fluoroelastomer comprises 35 weight percent of vinylidenefluoride, 34 weight percent of hexafluoropropylene, 29 weight percent of tetrafluoroethylene, and 2 weight percent cure site monomer.

4. The apparatus of claim 1, wherein said polyamino polysiloxane has the following formula:

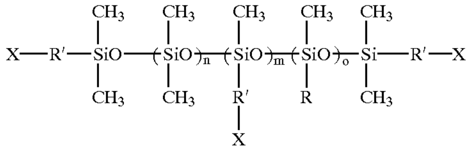

wherein R is selected from the group consisting of alkyls and aryls; R' is selected from the group consisting of alkylenes and arylenes; X is an amino functional group having an active hydrogen; n, m, and o are positive integers such that n+m+o provides an average molecular weight of from about 1,000 to about 20,000.

5. The apparatus of claim 4, wherein X is selected from the group consisting of $—NH_2$, —NR"H, and $—NHCO_2$.

6. The apparatus of claim 5, wherein said polyamino polysiloxane is selected from the group consisting of 1,3-bis(3-aminopropyl) tetramethyldisiloxane, aminopropylmethylsiloxane dimethyl siloxane, and aminoethylamino propylmethoxysiloxane dimethylsiloxane copolymers.

7. The apparatus of claim 6, wherein said polyamino polysiloxane is a bis(aminopropyl) terminated polydimethylsiloxane.

8. The apparatus of claim 1, wherein said fluoroelastomer is present in the outer layer in an amount of from about 50 to about 95 percent weight of total solids.

9. The apparatus of claim 1, wherein said polyamino siloxane is present in the outer layer in an amount of from about 5 to about 30 percent by weight of total solids.

10. The apparatus of claim 1, wherein said outer layer comprises a conductive filler.

11. The apparatus of claim 10, wherein said conductive filler is selected from the group consisting of metals, metal oxides, carbon blacks, conductive polymers, and mixtures thereof.

12. The apparatus of claim 11, wherein said conductive filler is a carbon filler selected from the group consisting of fluorinated carbon black, carbon black, graphite, and mixtures thereof.

13. The apparatus of claim 1, wherein said outer layer has a thickness of from about 0.1 to about 10 mils.

14. The apparatus of claim 1, wherein said transfix substrate comprises a material selected from the group consisting of metals, plastics, rubbers, and fabrics.

15. The apparatus of claim 14, wherein said transfix substrate comprises a polyimide.

16. The apparatus of claim 1, wherein an intermediate layer is positioned between said substrate and said outer layer.

17. The apparatus of claim 16, wherein said intermediate layer comprises a silicone material.

18. The apparatus of claim 17, wherein said intermediate layer comprises a conductive filler.

19. The apparatus of claim 1, wherein said intermediate layer has a thickness of from about 0.1 to about 10 mm.

20. The apparatus of claim 1, wherein said substrate is in the form of a transfix belt.

21. A transfix member comprising:

a) a transfix substrate, and thereover b) an outer coating comprising a hybrid composition comprising polyamino polysiloxane and fluoroelastomer, and c) a heating member associated with the transfix member.

22. An apparatus for forming images on a recording medium comprising:

a) a charge-retentive surface to receive an electrostatic latent image thereon;

b) a development component to apply a developer material to the charge-retentive surface to develop the electrostatic latent image to form a developed image on the charge-retentive surface;

c) a transfer component for transferring the developed image from the charge-retentive surface to an intermediate transfer component;

d) an intermediate transfer component for receiving the developed image from the transfer component and transferring the developed image to a transfix component; and e) a transfix component to transfer the developed image from the intermediate transfer component to a copy substrate and to fix the developed image to the copy substrate, the transfix component comprising:

i) a transfix substrate comprising a material selected from the group consisting of fabric and metal, and thereover ii) an outer coating comprising a hybrid composition comprising polyamino polysiloxane and fluoroelastomer, and iii) a heating member associated with the transfix component.

* * * * *